US005455837A

United States Patent [19]

Negus et al.

[11] Patent Number: 5,455,837

[45] Date of Patent: Oct. 3, 1995

[54] FLASHLAMP ENERGY CONTROL CIRCUIT

[75] Inventors: Daniel K. Negus, La Honda; Jim Chiu, Los Altos; Paul A. Cornelius, Redwood City, all of Calif.

[73] Assignee: Coherent, Inc., Santa Clara, Calif.

[21] Appl. No.: 310,565

[22] Filed: Sep. 22, 1994

[51] Int. Cl.$^{6}$ .................... H01S 3/00

[52] U.S. Cl. .................... 372/69; 372/38; 372/25; 372/70

[58] Field of Search .................... 372/69, 70, 25, 372/38

[56] References Cited

U.S. PATENT DOCUMENTS

| | | | |
|---|---|---|---|
| 3,350,604 | 10/1967 | Erickson | 315/151 |
| 3,648,104 | 3/1972 | Ackermann | 315/151 |
| 4,398,129 | 8/1983 | Logan | 372/25 |
| 4,439,861 | 3/1984 | Bradford | 372/25 |
| 4,469,991 | 9/1984 | McAllister | 372/70 |
| 4,498,180 | 2/1985 | Severinsson | 372/29 |
| 4,504,951 | 3/1985 | McMahan et al. | 372/38 |
| 4,611,270 | 9/1986 | Klauminzer et al. | 364/183 |
| 4,771,431 | 9/1988 | Nakazawa et al. | 372/38 |
| 4,813,048 | 3/1989 | Yamane et al. | 372/38 |
| 4,837,428 | 6/1989 | Takagi et al. | 250/205 |
| 4,856,012 | 8/1989 | Takenaka | 372/38 |
| 4,890,288 | 12/1989 | Inuyama et al. | 372/31 |
| 5,134,273 | 7/1992 | Wani et al. | 250/205 |
| 5,202,892 | 4/1993 | Harwick | 372/30 |
| 5,303,248 | 4/1994 | Gibbs | 372/25 |

*Primary Examiner*—Léon Scott, Jr.
*Attorney, Agent, or Firm*—Limbach & Limbach; Michael A. Stallman

[57] ABSTRACT

A circuit is disclosed for controlling the output of a flashlamp used to excite a gain medium. The circuit functions to supply energy to the flashlamp for fixed time intervals to generate repetitive pulses having a uniform duration. The circuit includes a photodetector for generating an output signal which is proportional to the light generated by the flashlamp. During a first phase of the fixed interval, the circuit delivers a first voltage level to the flashlamp. At the end of the first phase, a comparison is made between the output of the flashlamp as measured by the photodetector and a target output level. The circuit also initiates a second, boost phase where the voltage supplied to the flashlamp is increased. The length of the boost phase is selected so that at the end of the fixed interval, the total light output generated by the flashlamp is substantially equal to the desired output level.

42 Claims, 3 Drawing Sheets

FLASHLAMP ENERGY CONTROL CIRCUIT

TECHNICAL FIELD

The subject invention relates to a technique for energizing the optical pump source in a pulsed laser. The technique minimizes the pulse to pulse variations in the light output of the pump source without varying the length of the pump pulse.

BACKGROUND OF THE INVENTION

Various optical pump sources such as flashlamps have been used to excite gain media since the initial development of the laser. Light energy from the pump source excites the lasing species in the gain medium to the upper energy states allowing coherent light energy to be amplified.

The subject invention was developed for use with a flashlamp pumped, high power, high repetition rate phase conjugate laser amplifier. In this system, the pulsed output from a low power, master oscillator is directed through a flashlamp excited amplifier. This system is designed not only to produce high power pulses at high repetition rates, but also to produce a near diffraction limited beam. This laser is being marketed under the trademark Infinity by the assignee herein and is described in greater detail in copending U.S. patent application, Ser. No. 08/196,411, filed Feb. 15, 1994.

This laser system has a number of different applications such as laser pumping laser oscillators and OPO's, lidar, pulsed holography, machining, lithography and photoablation. Many of these applications require high output power pulses with good beam quality. Many of these applications also require that the energy of each pulse remain relatively constant. One problem with achieving this goal is that the total light generated by a flashlamp during an output pulse can vary significantly from pulse to pulse even if the same initial conditions are applied to the flashlamp.

The reasons for this variation in the light generated from the flashlamp are complex and not well understood. However, part of the problem appears to relate to the fact that the resistance characteristics of the flashlamp are not consistent from one shot to the next which may be due to the wandering of the arc in the flashlamp. In practice, it was found that the light energy out of even a relatively stable flashlamp could vary by about one percent (peak to peak) at low repetition rates and rise to a level of three percent at higher repetition rates. Although these variations may appear small, they can result in the introduction of significant noise or jitter into the output of the system which can be equal to or several times greater than the variations in the flashlamp output.

In the prior art, various techniques have been developed to control the amount of light generated by a flashlamp. In these techniques, the output of the flashlamp is monitored during the pulse by a photodetector. The flashlamp control circuit will continue to supply excitation energy to the flashlamp until the desired total level of light output (as measured by the photodetector and integrated by a capacitor) has been obtained.

This approach is effective to control the level of the light output by the flashlamp. Unfortunately, this approach is not suitable for use with the laser system described above. More specifically, in the prior art flashlamp control technique , in order to control the light generated by the flashlamp, the length of the flashlamp pulse was allowed to vary. However, in order to be useful in many of the applications referred to above, the length of each flashlamp pulse must be the same so that the output can be synchronized to other instrumentation. Therefore, it is not possible to utilize a technique for controlling the light generated by a flashlamp which permits the length of the lamp pulses to vary.

Accordingly, it is an object of the subject invention to provide a flashlamp control technique which minimizes the variation in the light output of a flashlamp without varying the duration of the flashlamp pulses.

SUMMARY OF THE INVENTION

In accordance with the technique of the subject invention, a circuit is disclosed for controlling the operation of an optical pump source which can be used to excite a gain medium in a laser amplifier or oscillator. In the illustrated embodiment, the optical pump source is a flashlamp. The circuit includes a power source for energizing the flashlamp for a fixed time interval. A photodetector is provided for monitoring the light output of the flashlamp and generating a signal proportional thereto.

The control circuit is arranged so that during a first phase of the fixed interval, a first voltage level is supplied to the flashlamp. In the preferred embodiment, the first voltage level is selected to be below that which would optimally produce the desired total output at the end of the fixed interval.

At the end of the first phase, the total integrated light generated by the flashlamp up to that point in time is compared to a target output level. The target output level corresponds to that level which would be produced if the flashlamp were generating the desired amount of light. The control circuit then increases the voltage level supplied to the flashlamp. The second, higher voltage level is maintained during a second phase of the fixed interval. During the second phase, the light output of the flashlamp is "boosted" above that which is generated during the first phase. After a certain time period, the control circuit reduces the voltage back down to the first voltage level.

The duration of the second phase of the cycle (boost period) is determined based upon the difference between the measured integrated output of the flashlamp at the end of the first phase and the target output level. If this difference is small, the length of the second phase boost period is small. If the difference is large, the length of the boost period will be large. In an alternative approach, the length of the second phase can remain a constant and the second voltage level can be independently selected to provide a sufficient boost in output to reach the desired total flashlamp output.

In initial experiments, it has been shown that the use of the subject circuit can reduce the levels of noise in the laser system described above by forty to fifty percent. It is believed that the subject invention would be useful in any system (such as a laser amplifier or oscillator) where it is desirable to minimize the variation in power and duration of successive laser pulses. The subject invention can be used to control various optical pump sources such as a laser diode where noise in the power supply circuit can cause the light output of the laser diode to vary.

Further objects and advantages of the subject invention will become apparent from the following detailed description taken in conjunction with the drawings in which:

DETAILED DESCRIPTION OF THE PREFERRED EMBODIMENT

Figure 1A:
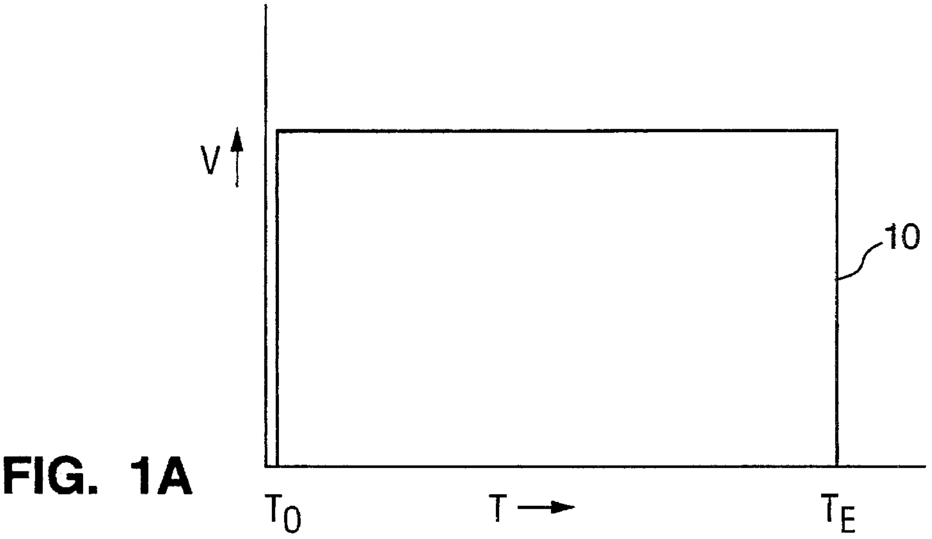
FIGS. 1*a*, 1*b* and 1*c* are graphs illustrating the voltage supplied to a flashlamp, the intensity of the light generated by the flashlamp during the pulse and the total light integrated output of the flashlamp.

FIG. 1*a* illustrates one type of supply voltage terminates at time $t_e$. This square waveform is of waveform 10 which is used to energize a flashlamp. This relatively square waveform starts at time $t_0$ and the type which is generated from a large storage capacitor which can hold significantly more energy than needed for a single pulse. This relatively square waveform can be compared to an exponentially decaying waveform which is generated by the full discharge of a smaller capacitor. For the applications herein, a square waveform is preferred in order to achieve higher efficiency and longer lamp lifetime.

Figure 1B:
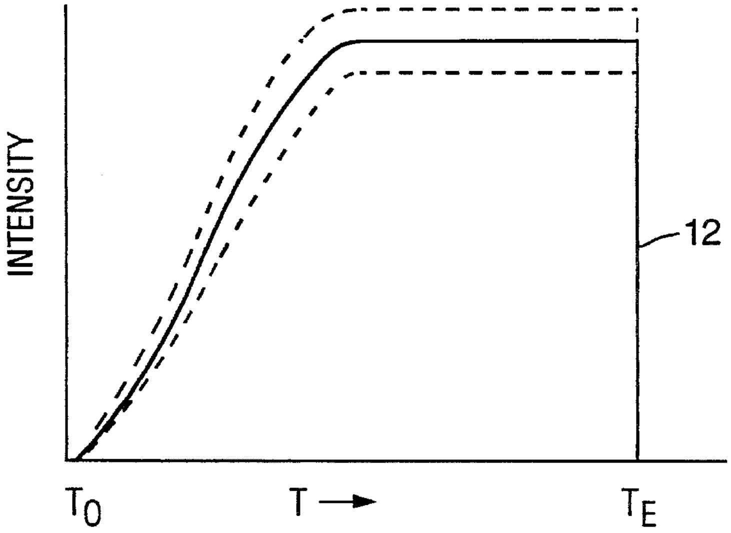
Figure 1C:
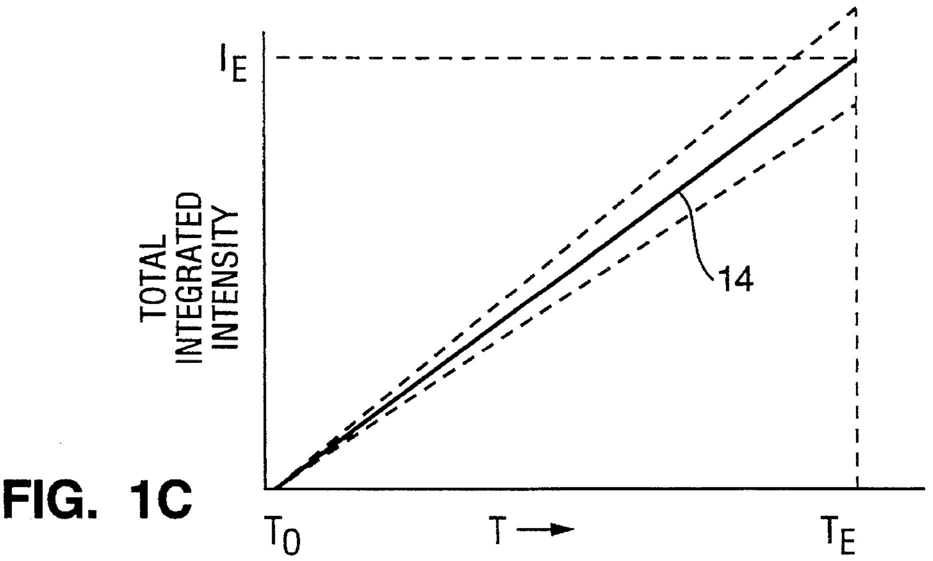

Curve 12 of FIG. 1*b* illustrates the intensity of light which is generated by a typical flashlamp in response to the voltage waveform 10 of FIG.1*a*. Curve 14 of FIG. 1*c* illustrates an integration of The total output level $I_e$ represents the ideal total intensity curve 12 and represents the total light output of the flashlamp during the pulse interval output of the flashlamp.

Unfortunately, and as noted above, a typical flashlamp does not consistently generate the same output energy for the same input conditions. More specifically, and as indicated by the dotted curves in FIG. 1*b*, the output of the flashlamp can vary from pulse to pulse. Similarly, the total light generated by the flashlamp will vary as indicated by the dotted curves in FIG. 1*c*. This variation can be as high as three percent at high repetition rates.

Figure 2:
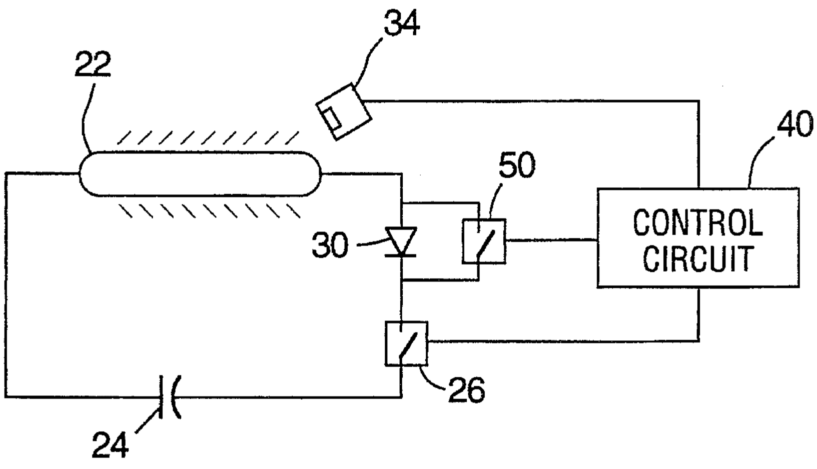
FIG. 2 is a block diagram of the flashlamp power circuit and the control circuit of the subject invention.

In order to minimize these variations, the flashlamp power circuit illustrated in FIG. 2 has been developed. This circuit includes a flashlamp 22 and a power source 24 in the form of a high current capacitor. Power from the capacitor 24 is delivered to the flashlamp 22 in response to the closure of switch 26. Since the capacitor has a high current, switch 26 should be formed from high current bipolar transistors. During the first phase of the pulse interval, the current supplied to the flashlamp passes through a resistive element 30 which, in the preferred embodiment, is defined by a bank of rectifiers (one shown for illustration purposes). This circuit will function to supply current to the flashlamp at a first voltage level.

In accordance with the subject invention, the output of the flashlamp is monitored by a photodetector 34. The photodetector 34 generates an output signal which is proportional to the light emitted by the flashlamp. This signal is supplied to the control circuit 40 described in more detail below with respect to FIG. 4.

Figure 3A:
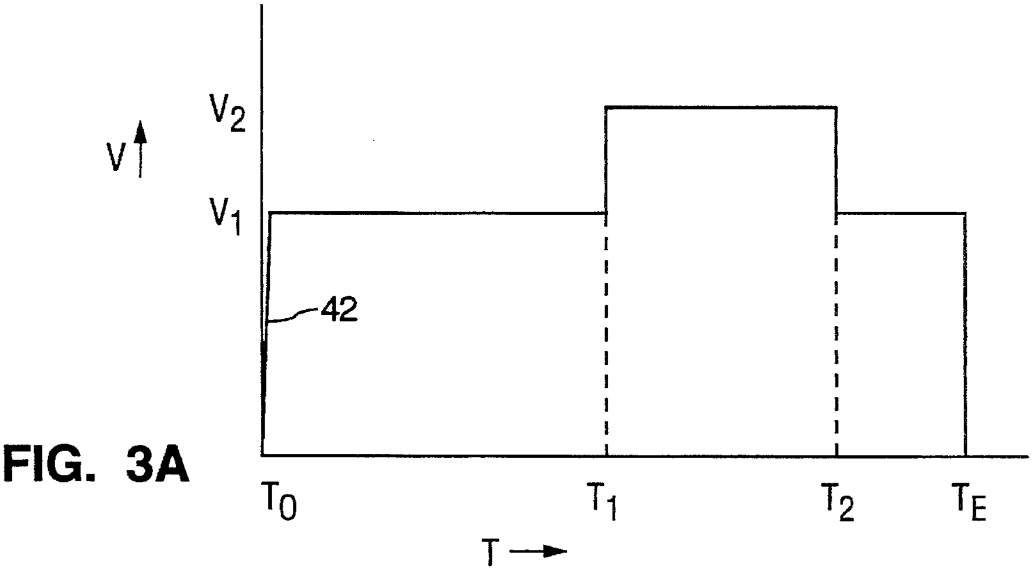
FIGS. 3*a* and 3*b* illustrate the voltage supplied to a flashlamp and the total integrated light generated by a flashlamp when operated with the control system of the subject invention.
Figure 3B:
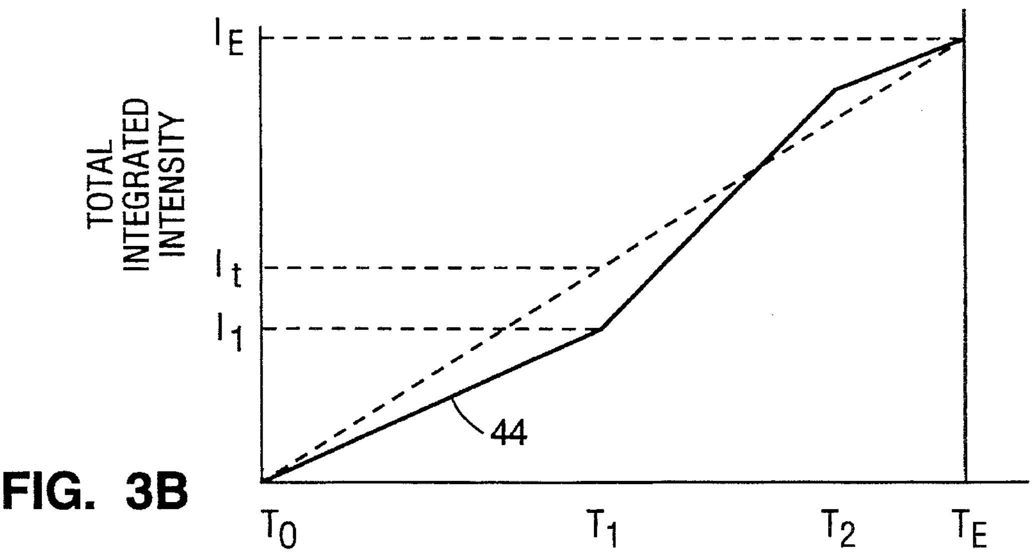

The general operation of the control circuit will first be described with reference to FIGS. 3*a* and 3*b*. More specifically, during a first phase of the pulse interval, a first voltage level $V_1$ is supplied to the flashlamp (curve 42). This voltage level corresponds to the voltage generated when switch 26 is closed and the current is passed through the rectifier bank 30. At time $t_1$, the total output $I_1$ (curve 44) of the flashlamp is determined based on the output of photodetector 34. This output is compared with a target output level output ($I_t$). The target level is the output level which would be generated if the flashlamp operated in an ideal, consistent manner.

In addition to determining the light generated by the flashlamp at time $t_1$, the control circuit 40 also closes switch 50 (FIG. 2). The closure of switch 50 forms a shunt circuit which bypasses the rectifier bank 30 and has the effect of lowering the resistance in the charging circuit. Once the resistance is lowered, the voltage level supplied to the flashlamp is increased to a level $V_2$ as shown in curve 42 of FIG. 3*a*. This increased voltage increases the light output of the flashlamp as illustrated by the increase in the slope of curve 44 beginning at time $t_1$ in FIG. 3*b*.

This increased voltage is applied to the flashlamp for a period between time $t_1$ and $t_2$. This second phase can be referred to as the "boost period" since the output of the flashlamp is higher during this period. The length of the boost period is determined by the comparison made at time $t_1$ between the measured output ($I_1$) and the target output level ($I_t$). The greater this difference (i.e. the more the measured output falls below the target), the longer the boost period will be. The length of the boost period is selected so that at the end of the pulse interval ($t_e$), the measured output will be as close as possible to the ideal output ($I_e$).

At the end of the boost period ($t_2$), the control circuit 40 functions to open switch 50. When switch 50 is opened, the shunt circuit is opened such that the resistance of rectifier bank 30 is put back into the charging circuit. At this point, and for the remainder of the pulse interval, the voltage level supplied to the flashlamp will be returned to lower level $V_1$. At this lower voltage level, the light generated by the flashlamp will decrease as indicated by the shallower slope of curve 44 in the time period $t_2$ to $t_e$. If the length of the boost period has been correctly selected, the total light output generated by the flashlamp will be substantially equal to the desired output $I_e$.

It is believed that the length of the first phase ($t_0$ to $t_1$) of the fixed interval should be equal to about half the total length of the interval. This first phase must be sufficiently long so that the performance of the flashlamp over the course of the entire interval can be more accurately predicted. On the other hand, the first phase must be short enough so that there will be sufficient time left over in the remainder of the interval to allow for correction via the boost period.

Figure 4:
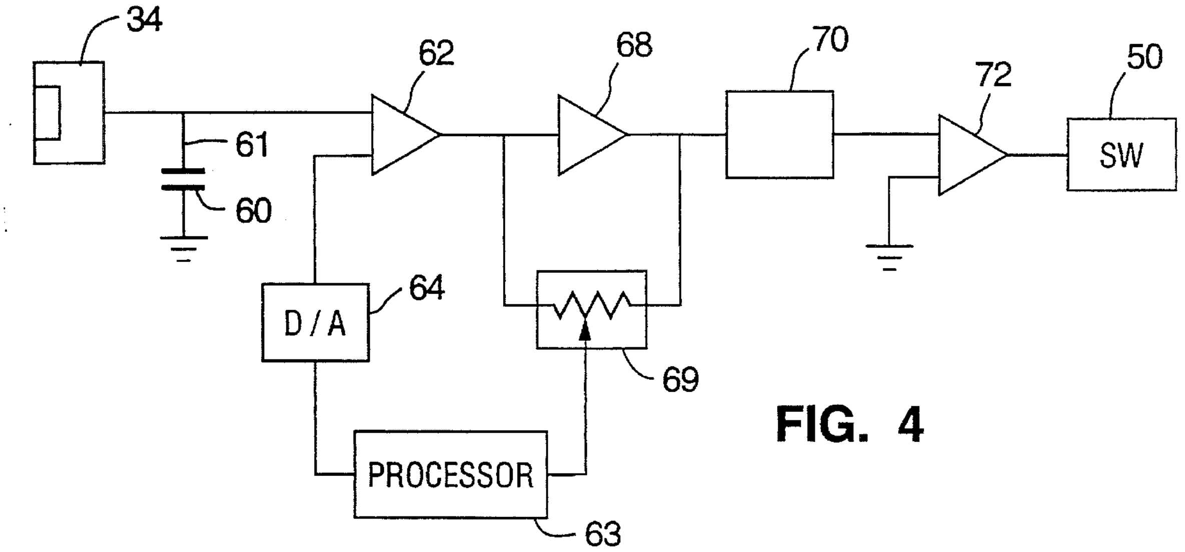
FIG. 4 is a schematic diagram of some of the details of the flashlamp control circuit of the subject invention.

FIG. 4 illustrates some of the components which can be used to form the control circuit 40 of the subject invention. As seen therein, the output of photodetector 34 is supplied to a capacitor 60. During the pulse interval, the photodetector will generate a current proportional to the light generated by the flashlamp. The output current from the photodetector is stored in the capacitor 60 during the pulse interval and the voltage at point 61 will represent an integration of the light output generated during the interval.

The output at terminal 61 of the capacitor is supplied to one input of a comparator 62. At time $t_1$, the voltage on the capacitor 60 is compared to a target output level (corresponding to $I_t$ in FIG. 3*b*). The target output level is supplied to the other input of the comparator 62. The target output level is generated by a processor 63 and converted to an analog voltage by a suitable digital to analog (D to A) converter 64. In the preferred embodiment, digital potentiometers are used for the D to A function.

The output generated by comparator 62 is proportional to the difference between the actual intensity ($I_1$) and the target intensity ($I_t$). This difference is then amplified by op-amp 68. The gain of the op-amp 68 is adjusted using a digital potentiometer 69 which, in turn, is controlled by processor 63. The processor 63 determines the optimum level of gain based on the calibrated characteristics of the circuit elements. This gain is determined using the following equation:

$$(1)Gain=(\Delta V_{cap}*T_{on})/(V_j*V_d*\Delta V_{in})$$

where $V_{cap}$ is the voltage on the main capacitor 24, $V_{in}$ is the voltage on comparator 62, with the value of $\Delta V_{cap}$ and $\Delta V_{in}$ being determined by setting capacitor 24 at two arbitrary levels and measuring the input voltage to comparator 62 at those two different levels. $V_j$ is the voltage drop across rectifier bank 30, Ton is the length of the flashlamp pulse and $V_d$ is the voltage decay rate characteristics (expressed in volts per microseconds) of converter 70 described immediately below.

The output of op-amp 68 is supplied to a voltage to time converter circuit 70. This circuit includes a sample and hold chip which is designed to store the voltage level supplied by the op-amp 68. A negatively biased resistor/capacitor network (not shown) functions to cause the voltage stored in the sample and hold chip to decay at a fixed rate (volts per microseconds), regardless of the starting voltage. When the voltage on the converter drops below zero, the zero crossing is detected by comparator 72. As long as a positive voltage remains in the converter 70, switch 50 will remain closed so that the higher voltage lever $V_2$ will be supplied to the flashlamp. When the voltage stored in the comparator 70 decays to zero, the output generated by comparator 72 in response to the zero crossing functions to trigger the opening of switch 50. When switch 50 is opened (at time $t_2$), the voltage supplied to the flashlamp is returned to the lower level $V_1$. This lower level is maintained until the end of the pulse interval at time $t_e$. In the preferred embodiment, switch 50 is defined by five Mosfets in parallel with a high current carrying capacity.

As can be appreciated, the difference between the upper and lower voltage levels ($V_1$ and $V_2$) is set by the number and size of the rectifiers in rectifier bank 30. The number of rectifiers selected must be sufficient to provide enough of a voltage difference during the boost period to allow for a full range of corrections.

During operation, it is preferable to simmer the flashlamp between output pulses to improve efficiency, increase lifetime and reduce jitter. The flashlamp is simmered by supplying a low level of energy thereto (approximately 1.5 amps). Since the flashlamp is continuously excited, it will emit a low level of light output which is monitored by the photodetector 34. This light output should be isolated from the measurements made by the photodetector during the actual flashlamp pulse. For this reason, it is preferable to short the capacitor 60 just prior to the initiation of each flashlamp pulse.

As noted above, in the preferred embodiment of the subject invention, the length of the first phase should be about one half of the total "on time" of the flashlamp. By this arrangement, enough data can be collected as to the operation of the flashlamp during that particular pulse while still allowing half of the pulse interval to make the correction.

It is also desirable to select the combination of the voltage on capacitor 26, the resistance of rectifier bank 30 and the target output level so that the average length of the second phase, boost period is about one-half of the time remaining in the flashlamp pulse (one quarter of the total flashlamp pulse). This relationship will allow for the broadest range of corrections. As can be appreciated, if the average length of the second phase is much longer than one quarter of the total on time, it is likely that there will be a number of flashlamp pulses where there is insufficient time in the boost cycle to reach the ultimate desired total light output. Similarly, if the average length of the second phase is much shorter than one quarter of the total time, it is likely that there will be a number of flashlamp pulses which will exceed the total desired light output even without invoking a boost in output.

In order to maximize the range of correction, it is preferable to provide a centering algorithm which effectively monitors the average length of successive boost periods and modifies the system parameters to insure that this average remains close to the optimum length. To achieve this goal, processor 63 stores and calculates a running average of the output generated by comparator 62 which represents the calibrated difference between the monitored integrated output $I_1$ and the target output level $I_t$. As noted above, this difference defines the length of the second phase. In the preferred embodiment, the running average is calculated based on the 16 most recent intervals. If the calculated average varies from the optimum (i.e. an amount corresponding to a boost period having a duration equal to one-half of the remaining fixed interval), the processor will compensate by resetting the target output level. Thus, if the calculated average difference is too large (and the duration of the second phase is too long), the target output level will be lowered so that the duration of the second phase will be shortened. Conversely, if the calculated average difference is too small (and the duration of the second phase is too short), the target output level will be raised. In this way, the average length of the second phase will remain centered on a value equal to one quarter of the length of the flashlamp pulse thus maximizing the range of possible corrections.

Any adjustments to the target output level will also result in a change in the total output of the flashlamp. However, the changes in the target output level, which are necessary to maintain the centering of the boost period, are relatively small compared to the total integrated output of the flashlamp and therefore the resultant changes in the flashlamp output would not be that significant. Nonetheless, in the preferred embodiment, the changes in the total output of the flashlamp are compensated with an additional feedback routine. This second feedback routine functions to vary the energy stored in the capacitor 24 in response to changes in the target output level. More specifically, if the target output level is lowered by the boost period centering algorithm, the voltage on the capacitor and therefore the energy supplied to the flashlamp will be increased. Conversely, if the target output level is raised by the centering algorithm, the voltage stored on the capacitor and therefore the energy supplied to the flashlamp will be reduced. This second feedback loop is slaved to the centering algorithm through a nested logic format and operated with a slower response time. Using this approach, the total integrated output from the flashlamp will remain relatively constant over time.

In the preferred embodiment described above, the voltage during the second phase is higher than during the first phase. The subject technique could also be implemented using an approach where a higher voltage is supplied during the first phase and a lower voltage is supplied during the second phase.

In the technique described above, variations in the energy supplied to the flashlamp during the second phase are achieved by boosting the voltage a predetermined amount and varying the length of the boost period. This can be considered a pulse width modulation approach. Similar results can be achieved if the length of the boost period was predetermined and variations in energy delivered during the boost period were achieved by varying the voltage level (either up or down) supplied to the flashlamp. The latter technique can be considered a pulse amplitude modulation approach. Of course, it would also be possible to vary the energy in the second phase by producing variations in both the length of the boost phase and the voltage level supplied to the flashlamp.

It should be understood the subject invention is intended to cover any situation where variations can be made in the energy supplied to the flashlamp during the second phase in a manner to permit variations in the total integrated output of the flashlamp to be minimized on a shot to shot basis. For example, an RF amplifier circuit could be used to vary the temperature of the cathode of the flashlamp in order to vary the light output during the excitation interval. It would also be possible to use a current steering circuit wherein energy from the power supply could be selectively directed away from the flashlamp to a current dump to vary the output of the flashlamp during the excitation interval.

Figure 5:
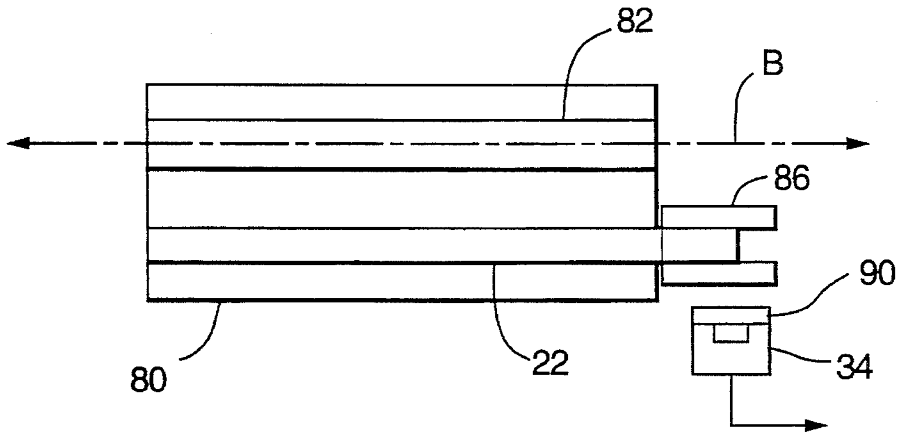
FIG. 5 is a diagram of the layout of a flashlamp, gain medium and photodetector formed in accordance with the subject invention.

FIG. 5 illustrates a preferred form of the structure used for detecting the output from the flashlamp. More specifically, an elongated flashlamp 22 is shown mounted in a support module 80. A rod shaped gain medium 82 is mounted adjacent to the flashlamp 22. A cylindrical element 86 is mounted around one end of the flashlamp. Element 86 is formed from Teflon and has two functions. First, element 86 acts as a heat shield reducing the amount of heat which can spread from the flashlamp into the path B of the laser beam. By shielding the heat, distortion from thermal lens effects in the air is minimized.

Element 86 also acts as a light diffuser which aids in homogenizing the light from the flashlamp before it reaches photodetector 34. In the preferred embodiment, a light filter 90 is mounted between the diffuser and the photodetector. Filter 90 is designed to transmit light in the wavelength region which is relevant for optically exciting the gain medium while absorbing light which merely tends to heat the gain medium. These criteria can be satisfied with a red, long pass filter which blocks UV radiation from reaching the detector.

In experiments where the subject circuit was used with the phase conjugate laser amplifier referred to above, it was found that the variations in the output of the flashlamp can be reduced by forty to fifty percent with an equivalent reduction in noise.

It should be understood that the subject technique can be extended to various other optical pump sources. For example, laser diodes can also be used to optically excite a gain medium. Any noise present in the electrical circuit used to power the laser diode can give rise to variations in the light output on a pulse to pulse basis. By using the subject technique, these variations can be minimized.

While the subject invention has been described with reference to a preferred embodiment, various changes and modifications could be made therein, by one skilled in the art, without varying from the scope and spirit of the subject invention as defined by the appended claims. It should also be understood that the term laser amplifier as used in the claims is intended to include both an amplifier and a laser oscillator where the gain medium is located within an optical resonator.

We claim:

1. A method of controlling the operation of a light source comprising the steps of:

supplying energy to a light source for a fixed time interval;

monitoring the output of the light source during a first phase of the fixed interval;

comparing the monitored output to a target level; and selecting the amount energy to be supplied to the light source during a second phase of the fixed interval based on the comparison step so that at the end of the fixed interval, the difference between the total output of the light source and a target output is minimized.

2. A method as recited in claim 1 wherein the selecting step includes setting the duration of the second phase of the fixed interval.

3. A method as recited in claim 1 wherein during the second phase, the voltage supplied to the light source is changed a predetermined amount with respect to the voltage supplied to the light source during the first phase and wherein the duration of the second phase is selected based upon the comparison step.

4. A method as recited in claim 3 wherein the voltage supplied to the light source during the second phase is higher than the voltage supplied to the light source during the first phase.

5. A method as recited in claim 4 wherein the voltage supplied to the light source between the end of the second phase and the end of the fixed interval is the same as during the first phase.

6. A method as recited in claim 1 wherein the selecting step includes setting the voltage to be supplied to the light source during the second phase based upon the comparison step.

7. A method as recited in claim 1 wherein the length of said first phase is substantially equal to one-half of the fixed interval.

8. A method as recited in claim 1 further including the step of setting the target level in a manner so that the average length of the second phase is equal to one half of the time remaining in the fixed interval after the termination of the first phase.

9. A method as recited in claim 1 further including the step of storing the difference between the target level and the output of the light source monitored at the end of the first phase of successive intervals and generating a running average and thereafter resetting the target level so that the difference between the monitored level and the target level remains within a predetermined range.

10. A method as recited in claim 1 wherein said light source is a flashlamp.

11. A control circuit comprising:

a light source;

a power supply for supplying energy to the flashlamp;

means for monitoring the output of the light source and generating a control signal proportional thereto; and circuit means for controlling the power supply and functioning to energize the light source for a fixed time interval including a first phase followed by a second phase, and wherein the amount of energy supplied to the power supply during the second phase is selected in response to the control signal generated by the monitoring means and in a manner to minimize the variation in the total output of the light source with respect to a target output.

12. A circuit as recited in claim 11 wherein circuit means functions to select the duration of the second phase based upon the control signal.

13. A circuit as recited in claim 11 wherein the voltage supplied to the light source by the circuit means during the second phase is changed a predetermined amount with respect to the voltage supplied to the light source during the first phase and wherein the duration of the second phase is selected based upon the control signal.

14. A circuit as recited in claim 13 wherein the voltage supplied to the light source during the second phase is higher than the voltage supplied to the light source during the first phase.

15. A circuit as recited in claim 13 wherein the voltage supplied to the light source between the end of the second phase and the end of the fixed interval is the same as during the first phase.

16. A circuit as recited in claim 11 wherein the voltage to be supplied to the light source during the second phase is selected based upon the control signal.

17. A circuit as recited in claim 11 wherein the length of said first phase is substantially equal to one-half of the fixed interval.

18. A circuit as recited in claim 11 wherein the monitoring means functions to generate a signal which integrates the output of the light source during said first phase.

19. A circuit as recited in claim 11 wherein the length of the second phase is selected based on a comparison of the control signal generated by said monitoring means and a target level.

20. A circuit as recited in claim 19 further including the step of setting the target level in a manner so that the average length of the second phase is equal to one half of the time remaining in the fixed interval after the termination of the first phase.

21. A circuit as recited in claim 19 further including a means for storing the difference between the target level and the output of the light source monitored at the end of the first phase of successive intervals and generating a running average, said means further functioning to reset the target level so that the difference between the monitored level and the target level remains within a predetermined range.

22. A circuit as recited in claim 11 wherein said monitoring means includes a photodetector for generating an output signal.

23. A circuit as recited in claim 22 wherein said monitoring means further includes a capacitor connected to the output signal of the photodetector and generating a voltage level which is proportional to the total light energy generated by the light source over time.

24. A circuit as recited in claim 23 wherein said light source is defined by a flashlamp.

25. A circuit as recited in claim 24 wherein a low level of energy is continuously supplied to the flashlamp causing said flashlamp to simmer and wherein said capacitor is shorted before the initiation of the fixed interval.

26. A method of operating a laser amplifier having a gain medium, said gain medium being optically excited by a flashlamp comprising the steps of:

repeatedly supplying energy to the flashlamp during fixed intervals of time, with the voltage during a first phase of each interval being set at first level;

monitoring the light output of the flashlamp during the first phase;

comparing the monitored light output with a target level and generating a control signal proportional thereto; and increasing the voltage to a predetermined level during a second phase of the interval, with the length of the second phase being selected in response to the control signal in a manner to boost the output of the flashlamp so that the variation in the total light output of the flashlamp at the end of successive intervals is minimized.

27. A method as recited in claim 26 wherein the voltage supplied to the flashlamp between the end of the second phase and the end of the fixed interval is the same as during the first phase.

28. A method as recited in claim 26 wherein the length of said first phase is substantially equal to one-half of the fixed interval.

29. A method as recited in claim 26 further including the step of setting the target level in a manner so that the average length of the second phase is equal to one half of the time remaining in the fixed interval after the termination of the first phase.

30. A method as recited in claim 26 further including the step of storing the difference between the target level and the output of the flashlamp monitored at the end of the first phase of successive intervals and generating a running average and thereafter resetting the target level so that the difference between the monitored level and the target level remains within a predetermined range.

31. A pulsed laser amplifier comprising:

a gain medium;

a flashlamp for optically exciting the gain medium;

a power supply for supplying energy to excite the flashlamp;

means for monitoring the light output of the flashlamp;

means for comparing the monitored light output with a target level and generating a control signal proportional thereto; and circuit means for controlling the power supply and functioning to repeatedly energize the flashlamp for successive fixed intervals of time, and wherein said circuit means generates a first voltage level during a first phase of the interval and a second, higher voltage level during a second phase of the interval, and with the length of the second phase being selected based on the control signal and functioning to boost the output of the flashlamp so that the variation in the total light output of the flashlamp at the end of successive intervals is minimized.

32. An amplifier as recited in claim 31 wherein said monitoring means is defined by a photodetector.

33. An amplifier as recited in claim 32 wherein said monitoring means further includes a capacitor connected to the photodetector and generating a voltage level which is proportional to the total light energy generated by the flashlamp over time.

34. A circuit as recited in claim 33 wherein a low level of energy is continuously supplied to the flashlamp causing said flashlamp to simmer and wherein said capacitor is shorted before the initiation of the fixed interval.

35. An amplifier as recited in claim 31 further including a filter located between the flashlamp and the photodetector and functioning to transmit radiation having wavelengths which primarily excites the gain medium and absorb wavelengths which primarily heat the gain medium.

36. An amplifier as recited in claim 31 including an optical element connected to the end of the flashlamp, said optical element for diffusing light generated by the flashlamp and monitored by the photodetector, said optical element being configured to minimize the flow of heat towards the gain medium.

37. An amplifier as recited in claim 31 wherein the circuit means functions to selectively add a resistance to the power supply, and wherein during said first phase, the resistance is added to the power supply to generate the first voltage level and during the second phase, the resistance is removed to generate the second, higher voltage level.

38. An amplifier as recited in claim 31 wherein the voltage supplied to the flashlamp between the end of the second phase and the end of the fixed interval is the same as during the first phase.

39. An amplifier as recited in claim 31 wherein the length of said first phase is substantially equal to one-half of the fixed interval.

40. An amplifier as recited in claim 31 wherein the monitoring means functions to generate a signal which integrates the output of the flashlamp during said first phase.

41. An amplifier as recited in claim 31 further including the step of setting the target level in a manner so that the average length of the second phase is equal to one half of the time remaining in the fixed interval after the termination of the first phase.

42. An amplifier as recited in claim 31 further including a means for storing the difference between the target level and the output of the flashlamp monitored at the end of the first phase of successive intervals and generating a running average, said means further functioning to reset the target level so that the difference between the monitored level and the target level remains within a predetermined range.

* * * * *